(12) United States Patent
Saito

(10) Patent No.: US 10,390,525 B2
(45) Date of Patent: Aug. 27, 2019

(54) RECIPROCATING MECHANISM OF SPINNING REEL AND SPINNING REEL COMPRISING THE SAME

(71) Applicant: Shimano Inc., Sakai, Osaka (JP)

(72) Inventor: Kei Saito, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/688,244

(22) Filed: Aug. 28, 2017

(65) Prior Publication Data

US 2018/0146653 A1 May 31, 2018

(30) Foreign Application Priority Data

Nov. 28, 2016 (JP) .................................. 2016-229825

(51) Int. Cl.
*A01K 89/01* (2006.01)

(52) U.S. Cl.
CPC .. *A01K 89/01142* (2015.05); *A01K 89/01083* (2015.05); *A01K 89/01143* (2015.05)

(58) Field of Classification Search
CPC ...... A01K 89/011223; A01K 89/01141; A01K 89/0114
See application file for complete search history.

(56) References Cited

U.S. PATENT DOCUMENTS

| | | | | |
|---|---|---|---|---|
| 5,273,234 A | * | 12/1993 | Hitomi | ............... A01K 89/0114 |
| | | | | 242/241 |
| 5,775,612 A | * | 7/1998 | Hashimoto | ........ A01K 89/0114 |
| | | | | 242/241 |
| 2004/0035968 A1 | * | 2/2004 | Takikura | ............ A01K 89/0114 |
| | | | | 242/242 |
| 2006/0231657 A1 | * | 10/2006 | Morise | ............... A01K 89/0111 |
| | | | | 242/244 |
| 2007/0181727 A1 | * | 8/2007 | Kitajima | ............ A01K 89/0114 |
| | | | | 242/241 |

(Continued)

FOREIGN PATENT DOCUMENTS

| EP | 1 413 194 A2 | 7/2003 |
|---|---|---|
| EP | 2 842 419 A1 | 8/2014 |

(Continued)

OTHER PUBLICATIONS

European Search Report of corresponding EP Application No. 17 19 4882.1 dated Apr. 18, 2018.

*Primary Examiner* — Emmanuel M Marcelo (74) *Attorney, Agent, or Firm* — Global IP Counselors, LLP (57) ABSTRACT

A reciprocating mechanism includes a worm shaft, a slider, a first guide shaft, and an elastic member. The worm shaft includes spiral grooves, and is rotated while the handle is rotated. The slider is reciprocated in the axial direction together with the spool shaft in conjunction with the rotation of the worm shaft. The first guide shaft includes a first supporting portion and a second supporting portion, and guides the reciprocating movement of the slider by an intermediate portion between the first supporting portion and the second supporting portion. The elastic member is mounted on the outer perimeter of at least one of the first supporting portion and the second supporting portion, and supports the first guide shaft in the reel body.

8 Claims, 5 Drawing Sheets

(56) References Cited

U.S. PATENT DOCUMENTS

| 2015/0048192 A1* | 2/2015 | Matsuo | A01K 89/0114 242/241 |
| 2015/0090820 A1* | 4/2015 | Ochiai | A01K 89/0114 242/242 |

FOREIGN PATENT DOCUMENTS

| JP | 6-15471 U | 3/1994 |
| JP | 2005-245252 A | 9/2005 |

\* cited by examiner

RECIPROCATING MECHANISM OF SPINNING REEL AND SPINNING REEL COMPRISING THE SAME

CROSS-REFERENCE TO RELATED APPLICATIONS

This application claims priority to Japanese Patent Application No. 2016-229825, filed on Nov. 28, 2016. The entire disclosure of Japanese Patent Application No. 2016-229825 is hereby incorporated herein by reference.

BACKGROUND

Field of the Invention

The present invention relates to a reciprocating mechanism of a spinning reel, and in particular, to a reciprocating mechanism for reciprocating a spool, onto which a fishing line is wound, with respect to a reel body, and a spinning reel comprising the same.

Description of Art

A reciprocating mechanism for evenly winding a fishing line onto a spool is provided in a spinning reel. The reciprocating mechanism comprises, for example, a worm shaft that is rotated together with the rotation of a handle; a slider reciprocated in a spool shaft direction together with a spool shaft accompanying the rotation of the worm shaft; and a guide shaft that guides the reciprocation of the slider (refer to Japanese Laid-Open Patent Publication No. 2005-245252). In general, a gap is provided in a reciprocating mechanism between the slider and the guide shaft, in order to allow parallel error between the spool shaft and the guide shaft, as well as dimensional error between the slider and the guide shaft.

SUMMARY

If there is a gap between the slider and the guide shaft, backlash occurs between the slider and the guide shaft when the reciprocating mechanism is reciprocated by the rotation of the handle. Further, during rotation of the handle, backlash can also occur between the guide shaft and the reel body that supports the guide shaft. This backlash is transmitted to the spool shaft connected to the slider, generating backlash in the spool shaft, thereby generating backlash (vibration) of the reel body.

The object of the present invention is to suppress backlash between the slider and the guide shaft that occurs when the reciprocating mechanism is reciprocated, in a reciprocating mechanism of a spinning reel and a spinning reel comprising the same.

The reciprocating mechanism of a spinning reel according to one aspect of the present invention reciprocates a spool shaft, on which a spool is mounted, in the axial direction of the spool shaft with respect to a reel body by rotating a handle, and comprises a rotating member, a slider, a first guide shaft, and an elastic member. The rotating member comprises an engagement portion and is rotated while the handle is rotated. The slider, connected to the spool shaft, comprises an engaged portion engaged with the engagement portion of the rotating member, and is reciprocated in the axial direction together with the spool shaft, in conjunction with the rotation of the rotating member. The first guide shaft comprises a first supporting portion and a second supporting portion on opposite ends, and guides the reciprocating movement of the slider by supporting the slider by an intermediate portion between the first supporting portion and the second supporting portion. The elastic member is mounted on the outer perimeter of at least one of the first supporting portion and the second supporting portion, and supports the first guide shaft in the reel body.

In this reciprocating mechanism of a spinning reel, the first guide shaft is supported in the reel body via an elastic member mounted on the outer perimeter of at least one of the first and second supporting portions of the first guide shaft. Accordingly, the first guide shaft is movable in the radial direction accompanying an elastic deformation of the elastic member and is capable of allowing parallel error between the spool shaft and the guide shaft, as well as dimensional error between the slider and the guide shaft by utilizing the elastic deformation of the elastic member. It is thereby possible to dispose the slider abutting the guide shaft; suppressing the backlash that occurs between the slider and the guide shaft.

Preferably, the slider abuts the first guide shaft. This arrangement can suppress the backlash that occurs between the slider and the guide shaft.

Preferably, an annular groove is formed on the outer perimeter of at least one of the first and second supporting portions, and the elastic member is mounted in the annular groove. This arrangement, since the elastic member is supported by the groove, can prevent misalignment or falling of the elastic member.

Preferably, at least one of the first and second supporting portions on which an annular groove is formed has an abutting portion that abuts the reel body when the elastic member has undergone a prescribed amount of elastic deformation. This arrangement, for example, when the elastic member receives a high load and has undergone large elastic deformation, can regulate the movement of the first guide shaft in the radial direction such that the first guide shaft does not significantly move in the radial direction.

Preferably, a second guide shaft can be provided. The second guide shaft is disposed parallel to the spool shaft and guides the reciprocal movement of the slider in the axial direction with a prescribed gap from the slider. The first guide shaft is disposed in a position that is farther from the spool shaft than the second guide shaft. In this case, for example, it is possible to smoothly and stably guide the reciprocal movement of the slider, by abutting the slider to the first guide shaft, which is farther from the spool shaft, in order to suppress backlash, and provide a prescribed gap between the slider and the second guide shaft, which is closer to the spool shaft, such that the movement of the slider is not slowed.

Preferably, the rotating member is a worm shaft with intersecting spiral grooves formed thereon, and the engagement portion of the rotating member is the spiral grooves of the worm shaft. With this structure, it is possible to realize the reciprocating mechanism according to the present invention using a worm shaft.

Preferably, the rotating member is a cam gear having a cam portion, and the engagement portion of the rotating member is the cam portion of the cam gear. With this structure, it is possible to realize the reciprocating mechanism according to the present invention using a cam gear.

The reciprocating mechanism of a spinning reel according to one aspect of the present invention comprises a handle rotatably disposed on a side portion of the reel body, a spool shaft disposed in the reel body so as to be movable in the longitudinal direction, a spool for winding a line disposed on the front portion of the spool shaft, and a reciprocating mechanism that reciprocates the spool shaft in the axial direction of the spool shaft with respect to the reel body in conjunction with the rotation of the handle. The reciprocating mechanism comprises a rotating member, a slider, a first guide shaft, and an elastic member. The rotating member comprises an engagement portion and is rotated by rotation of the handle. The slider connected to the spool shaft, comprises an engaged portion that is engaged with the engagement portion of the rotating member, and is reciprocated in the axial direction together with the spool shaft, in conjunction with the rotation of the rotating member. The first guide shaft comprises a first supporting portion and a second supporting portion on opposite ends thereof, and guides the reciprocating movement of the slider by supporting the slider on an intermediate portion between the first and second supporting portions. The elastic member is mounted on the outer perimeter of at least one of the first and second supporting portions. The first guide shaft is supported on the reel body via the elastic member.

In the spinning reel, the first guide shaft is supported on the reel body via an elastic member mounted on the outer perimeter of at least one of the first and second supporting portions of the first guide shaft. Accordingly, the first guide shaft is movable in the radial direction accompanying an elastic deformation of the elastic member, and is capable of allowing parallel error between the spool shaft and the guide shaft, as well as a dimensional error between the slider and the guide shaft by utilizing this elastic deformation of the elastic member. It thereby is possible to dispose the slider abutting the guide shaft; in this arrangement, it is possible to suppress the backlash that occurs between the slider and the guide shaft.

Preferably, the reel body further comprises a movement regulation part that abuts at least one of the first and second supporting portions on which the elastic member is mounted, when the elastic member has undergone a prescribed amount of elastic deformation, to regulate the movement of the first guide shaft in the radial direction.

In this arrangement, it is possible to regulate the movement of the first guide shaft in the radial direction by the movement regulation part, such that the first guide shaft does not significantly move in the radial direction when the elastic member has undergone a prescribed amount of elastic deformation.

According to the present invention, it is possible to suppress backlash that occurs between the slider and the guide shaft.

DETAILED DESCRIPTION OF THE INVENTION

First Embodiment

Figure 1:
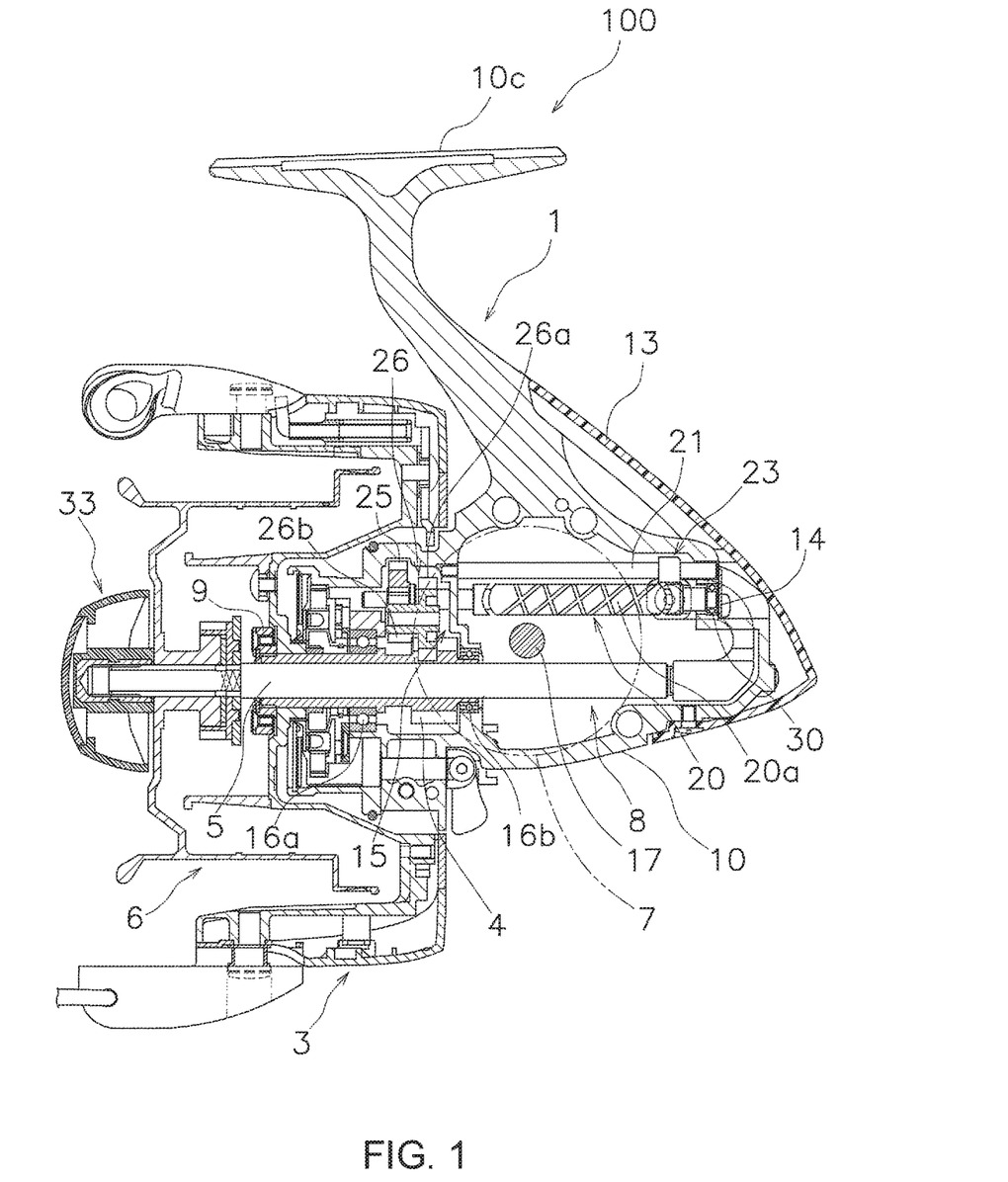
FIG. 1 is a cross-sectional view of a spinning reel illustrating a first embodiment of the present invention.
Figure 2:
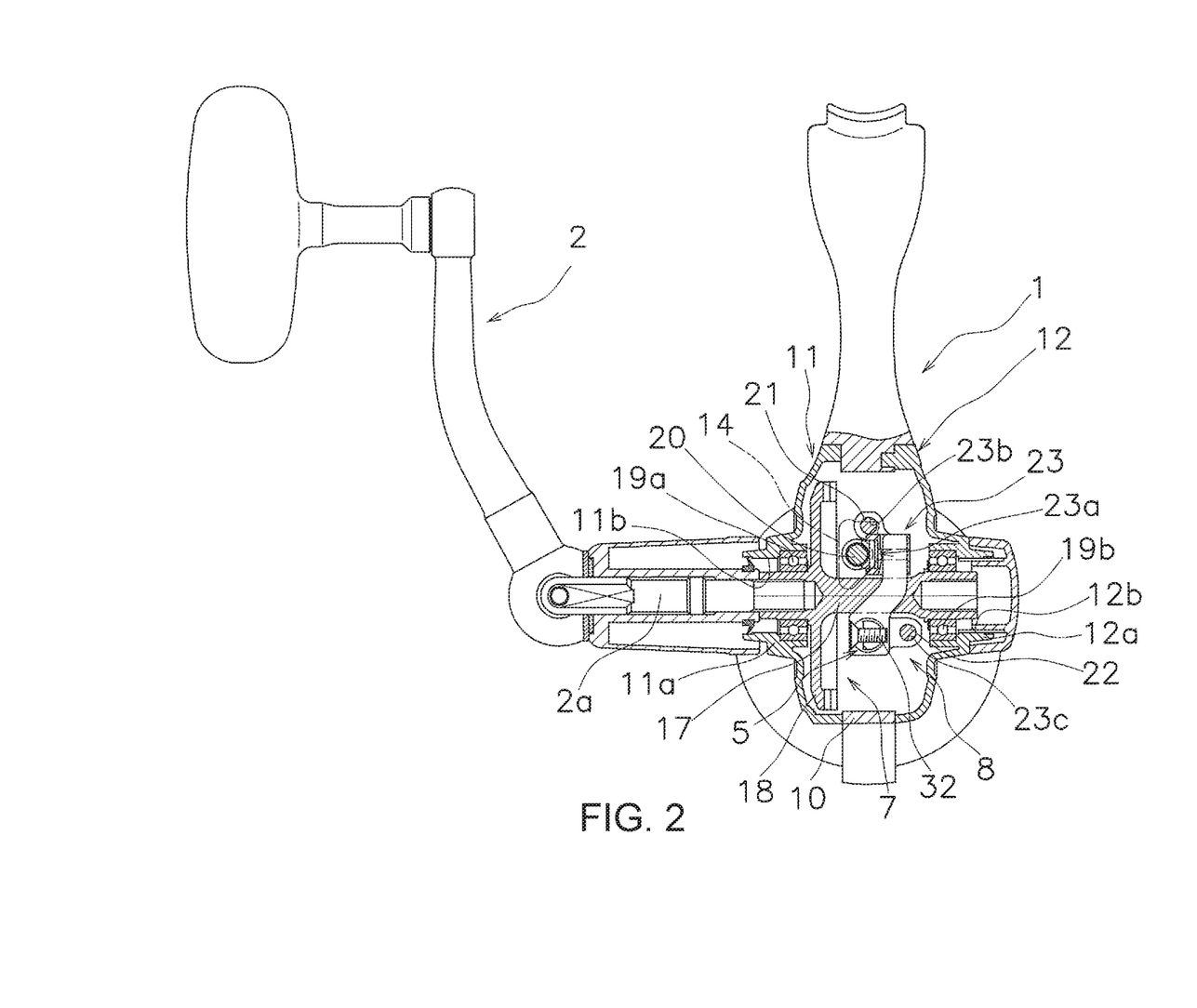
FIG. 2 is a rear cross-sectional view of the spinning reel according to the first embodiment of the present invention.

The spinning reel 100 according to an embodiment of the present invention comprises a reel body 1, a handle 2, a rotor 3, a pinion gear 4, a spool shaft 5, a spool 6, a drive mechanism 7, and a reciprocating mechanism 8, as shown in FIG. 1 and FIG. 2. Meanwhile, in the following description, regarding the terms front and rear, when fishing, the direction in which the fishing line is unreeled (cast) is referred to as the front, and the opposite direction is referred to as the rear. Further, the left and right mean the left and right when looking at the spinning reel 100 from the rear.

The reel body 1 comprises a chassis 10, a first lid member 11, a second lid member 12, a main body guard 13, and a retainer plate 14.

The chassis 10 is a frame-like member open on both sides. The drive mechanism 7, the reciprocating mechanism 8, and the like are housed in the chassis 10. In the center portion of the chassis 10, a disc-shaped mechanism supporting part 15 is formed to which the pinion gear 4 is mounted.

Figure 3:
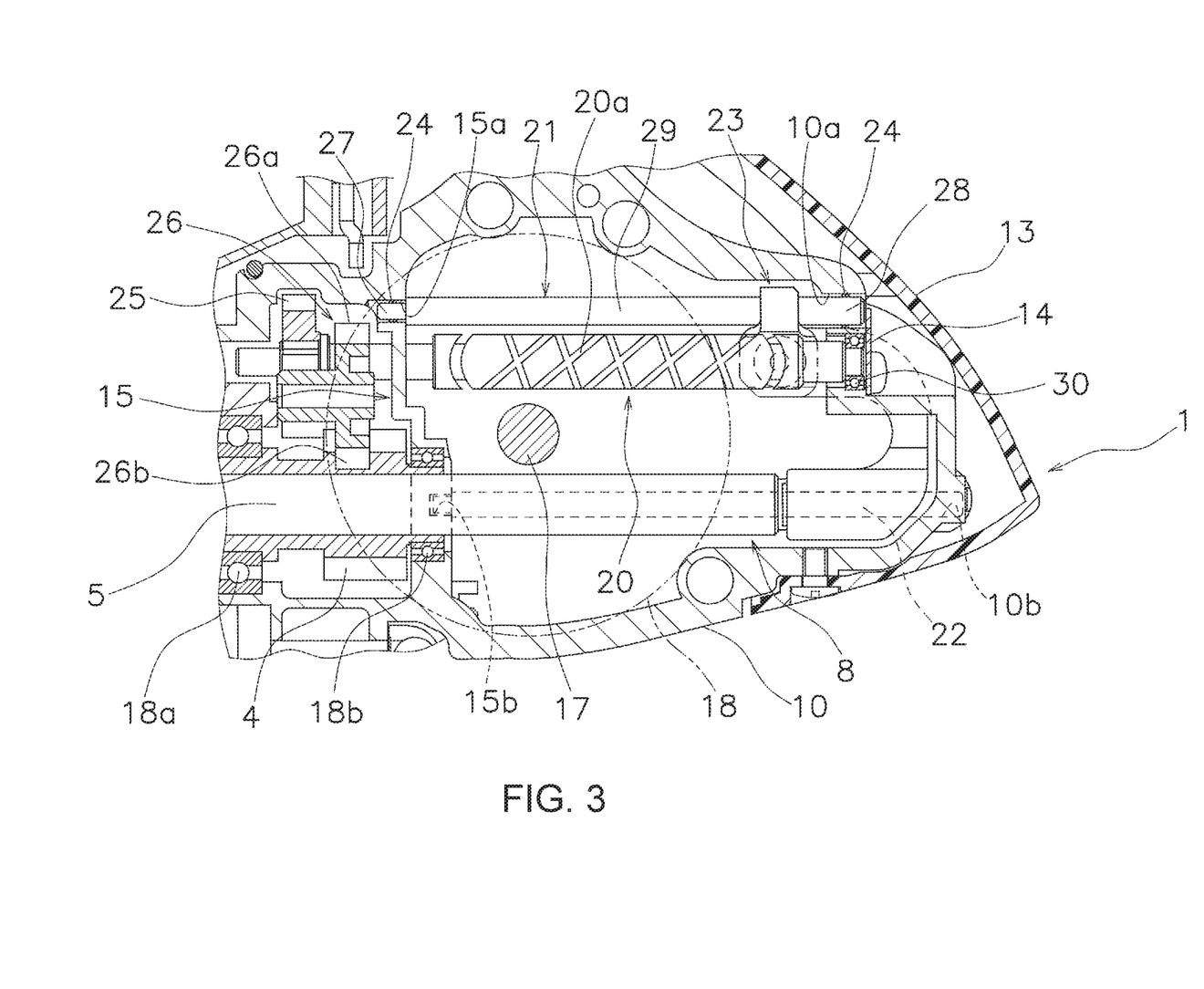
FIG. 3 is an enlarged partial view of FIG. 1.

As shown in FIG. 3, a first mounting hole 15a and a second mounting hole 15b are formed in the mechanism supporting part 15. One end (e.g., a first end) of the first guide shaft 21 and the second guide shaft 22 of the reciprocating mechanism 8, described later, are mounted in the first mounting hole 15a and the second mounting hole 15b.

A first through-hole 10a and a second through-hole 10b for mounting the other ends (e.g., second ends) of the first guide shaft 21 and the second guide shaft 22 are formed in the rear portion of the chassis 10.

The chassis 10 comprises a mounting portion 10c (refer to FIG. 1) on the upper portion of the chassis 10. The mounting portion 10c is formed extending in the front and rear directions. The mounting portion 10c is the portion mounted to the fishing rod.

As shown in FIG. 2, the first lid member 11 is formed so as to cover the left side of the chassis 10. The first lid member 11 comprises a tubular first boss portion 11a. A first insertion hole 11b for inserting a handle shaft 2a, which is connected to the handle 2, is formed in the first boss portion 11a. A first axle bearing member 19a supporting one end of the drive shaft 17 is mounted on the inner surface of the first boss portion 11a.

The second lid member 12 is formed so as to cover the right side of the chassis 10. The second lid member 12 comprises a tubular second boss portion 12a. A second insertion hole 12b for inserting the handle shaft 2a is formed in the second boss portion 12a. A second axle bearing member 19b for supporting the other end of the drive shaft 17 is formed in the inner surface of the second boss portion 12a.

The first lid member 11 and the second lid member 12 are fixed to the chassis 10 by screw members.

The main body guard 13 is disposed at the rear of the reel body 1. In particular, the main body guard is formed curved so as to cover the chassis 10, the first lid member 11, and the second lid member 12, of the reel body 1. The main body guard 13 is fixed to the chassis 10 by a plurality of screw members, which are not shown.

The retainer plate 14 is a plate-like member and holds and retains the axle bearing 30 and the first guide shaft 21, described later. The retainer plate 14 is fixed to the rear portion of the chassis 10 by a plurality of screw members, which are not shown.

As shown in FIG. 2, the handle 2 is disposed on the side portion of the reel body 1 so as to be rotatable with respect to the reel body 1.

The rotor 3 (refer to FIG. 1) is a member for winding the fishing line onto spool 6. The rotor 3 is fixed to the front portion of the pinion gear 4, and is integrally rotated with the pinion gear 4.

The pinion gear 4 is a hollow, tubular member and is disposed in the reel body 1. The rotor 3 extends through the front portion of the pinion gear 4, and the rotor 3 and pinion gear 4 are connected by a nut 9 so as to be integrally rotatable. As shown in FIG. 1, the pinion gear 4 is rotatably supported on the reel body 1 by an axle bearing 16a and an axle bearing 16b disposed on the chassis 10 of the reel body 1.

The spool shaft 5 is disposed in the reel body 1, extending in the longitudinal direction. The spool shaft 5 extends through the inside of the pinion gear 4.

The spool 6 is a member with an outer perimeter on which the fishing line is wound. As shown in FIG. 1, the spool 6 is fixed to the spool shaft 5 by a knob member 33 that screws onto the tip of the spool shaft 5. The spool 6 is reciprocated in the axial direction of the spool shaft 5 (hereinafter referred to as the spool shaft direction) integrally with the spool shaft 5.

As shown in FIG. 2, the drive mechanism 7 is formed by a tubular drive shaft 17 and a drive gear 18. The handle shaft 2a is fixed to the drive shaft 17. Both ends of the drive shaft 17 are rotatably supported on the reel body 1 by first and second axle bearing members 19a, 19b.

The drive gear 18 is coupled to the drive shaft 17, and integrally rotates with the drive shaft 17. In particular, the drive shaft 17 and the drive gear 18 can be formed from one member. The drive gear 18 is a face gear, and meshes with the pinion gear 4. The drive shaft 17 and the drive gear 18 are rotated accompanying the rotation of the handle 2 attached to the reel body 1, and the pinion gear 4, which meshes with the drive gear is also rotated. Accompanying the rotation of the pinion gear 4, the spool shaft 5 is reciprocated in the spool shaft direction by the reciprocating mechanism 8.

As shown in FIG. 1, FIG. 2, and FIG. 3, the reciprocating mechanism 8 comprises a worm shaft 20 (one example of a rotating member), a first guide shaft 21, a second guide shaft 22, a slider 23, and an elastic member 24. The reciprocating mechanism 8 reciprocates the spool shaft 5 in the spool shaft direction with respect to the reel body 1 by the rotation of the handle 2. As result, when winding the fishing line by rotating the handle 2, the spool 6, which is fixed to the spool shaft 5, is reciprocated in the spool shaft direction and the fishing line is evenly wound on the spool 6.

The worm shaft 20 is disposed parallel to the spool shaft 5 in a position above the spool shaft 5. The worm shaft 20 is supported by an axle bearing 30 mounted at the rear end of the chassis 10, and an axle bearing, which is not shown, mounted to the mechanism supporting part 15. Intersecting spiral grooves 20a (one example of an engagement portion) are formed on the outer perimeter surface of the worm shaft 20.

The worm shaft 20 is rotated accompanying the rotation of the handle 2. In particular, the rotation of the pinion gear 4, which is rotated accompanying the rotation of the handle 2, is transmitted to an intermediate gear 25 integrally and rotatably mounted on a front end portion of the worm shaft 20 via a stepped gear 26 (refer to FIG. 1). The worm shaft 20 is thereby rotated.

The stepped gear 26 comprises a large-diameter gear 26a that meshes with the pinion gear 4, and a small-diameter gear 26b that meshes with the intermediate gear 25. The stepped gear 26 reduces the speed of the reciprocal movement of the spool 6. In particular, when the pinion gear 4 is rotated accompanying the rotation of the handle 2, the large-diameter gear 26a, which meshes with the pinion gear 4, is rotated. The small-diameter gear 26b, which is integrally formed to the large-diameter gear 26a, is rotated by the rotation of the large-diameter gear 26a. Then, the speed of the reciprocal movement of the spool 6 is reduced by the small-diameter gear 26b meshing with the intermediate gear 25.

The first guide shaft 21 guides the reciprocal movement of the slider 23 in the spool shaft direction. The first guide shaft 21 is disposed parallel to the spool shaft 5 in a position proximate to the worm shaft 20. Here, as shown in FIG. 2 and FIG. 3, the first guide shaft 21 is above the worm shaft 20.

The first guide shaft 21 comprises a first supporting portion 27 and a second supporting portion 28, which are respectively formed at each end, and an intermediate portion 29 between the first supporting portion 27 and the second supporting portion 28. The outer diameter of the first supporting portion 27 has a smaller diameter than the outer diameter of the intermediate portion 29. The first supporting portion 27 is mounted in a first mounting hole 15a of the mechanism supporting part 15 via an elastic member 24, which will be described later. The second supporting portion 28 is mounted in a first through-hole 10a of the chassis 10 via the elastic member 24, which will be described later. As a result, the two ends of the first guide shaft 21 are respectively supported. The first guide shaft 21 is regulated in movement in the axial direction by a portion of the front end surface of the intermediate portion 29 abutting the mechanism supporting part 15, and is retained by a retainer plate 14, which is fixed to the rear portion of the chassis 10.

The intermediate portion 29 is fitted to a first guide hole 23b of the slider 23, which will be described later, and guides the reciprocal movement of the slider 23 in the spool shaft direction.

The second guide shaft 22 guides the reciprocal movement of the slider 23 in the spool shaft direction, in the same manner as the first guide shaft 21. The second guide shaft 22 is disposed parallel to the spool shaft 5 in a position proximate to the spool shaft 5. Here, as shown in FIG. 2 and FIG. 3, the second guide shaft 22 is on the right side of the spool shaft 5. The second guide shaft 22 is supported by the chassis 10 and the mechanism supporting part 15. In particular, the two ends of the second guide shaft 22 are mounted in a second mounting hole 15b of the mechanism supporting part 15 and a second through-hole 10b of the chassis 10. The second guide shaft 22 is retained by a head portion of the screw member (not shown) screwed into the rear surface of the chassis 10.

The slider 23 extends above and below the drive shaft 17. In addition, the slider 23 is formed in a substantially U-shape, which is curved along the outer perimeter portion of the drive shaft 17, such that the inner perimeter portion conforms to the outer perimeter of the drive gear 18. The slider 23 is connected to the rear end portion of the spool shaft 5 by a screw member 32 (refer to FIG. 2).

As shown in FIG. 2, the slider 23 comprises an engaged portion 23a that engages the spiral grooves 20a of the worm shaft 20, and first and second guide holes 23b, 23c that extend through in the spool shaft direction. The slider 23 is reciprocated in the spool shaft direction according to the rotation of the worm shaft 20, by the distal end of the engaged portion 23a engaging the spiral grooves 20a. Accompanying the above, the spool shaft 5 is reciprocated in conjunction with the rotation of the handle 2.

Figure 4:
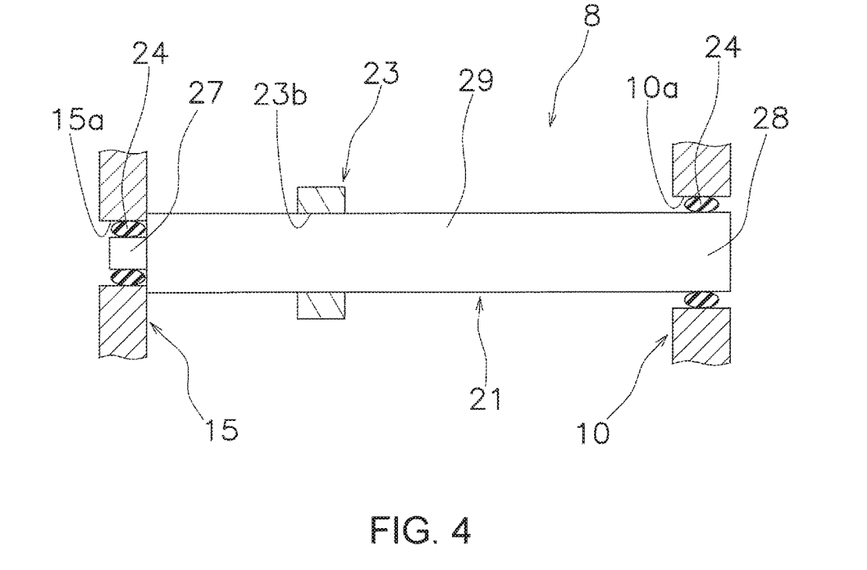
FIG. 4 is a schematic view showing the first guide shaft disposed on the slider and the reel body according to the first embodiment of the present invention.

The first guide hole 23b is formed in the upper portion of the slider 23. As schematically shown in FIG. 4, the first guide shaft 21 extends through, and the intermediate portion 29 of the first guide shaft 21 abuts with, the first guide hole 23b. Thus, it is possible to suppress the backlash that occurs between the slider 23 and the first guide shaft 21, when the slider 23 is reciprocated along the first guide shaft 21, by the first guide shaft 21 being disposed abutting the first guide hole 23b.

The second guide hole 23c is formed in the lower portion of the slider 23. A second guide shaft 22 extends through the second guide hole 23c with a prescribed gap from the second guide hole 23c.

The elastic member 24 is a made of an elastically deformable resin, or the like, for example an O-ring. As schematically shown in FIG. 3 and FIG. 4, the elastic member 24 is mounted on the respective outer perimeters of the first supporting portion 27 and the second supporting portion 28 of the first guide shaft 21.

By mounting the elastic member 24 on the first supporting portion 27 and the second supporting portion 28, prescribed gaps are formed in the radial direction between the first supporting portion 27 and the first mounting hole 15a, as well as between the second supporting portion 28 and the first through-hole 10a of the chassis 10. By these gaps, the first guide shaft 21 is able to move in the radial direction accompanying an elastic deformation of the elastic member 24, when the elastic member 24 is elastically deformed by receiving a prescribed load. As a result, even when the slider 23 is disposed on the first guide shaft 21, it is possible to allow parallel error between the spool shaft 5 and the first guide shaft 21, as well as dimensional error between the slider 23 and the first guide shaft 21, by utilizing the elastic deformation of the elastic members 24.

Further, the elastic members 24 suppress vibration that occurs when the slider 23 rubs against the first guide shaft 21. In particular, since the first guide hole 23b of the slider 23 abuts the intermediate portion 29 of the first guide shaft 21, when the slider 23 reciprocates the first guide shaft 21, vibration due to friction occurs by the slider 23 sliding on the first guide shaft 21. It is possible to suppress this vibration with the elastic members 24 mounted to the first and second supporting portions 27, 28.

In the present embodiment, two guide shafts (first and second guide shafts 21, 22) are provided, and elastic members 24 are disposed only on the guide shaft that is farther away from the spool shaft 5, that is, the first guide shaft 21; furthermore, the slider 23 is disposed abutting only the first guide shaft 21. On the other hand, a prescribed gap is between the second guide shaft 22 and the second guide hole 23c of the slider 23, such that the movement of the slider 23 accompanying the rotation of the handle 2 is not slowed. In this manner, the reciprocating mechanism 8 is formed such that the slider 23 abuts the first guide shaft 21, which is farther away from the spool shaft 5, to suppress backlash, and a prescribed gap is between the slider 23 and the second guide shaft 22, which is closer to the spool shaft 5, such that the movement of the slider 23 is not slowed.

Second Embodiment

Figure 5:
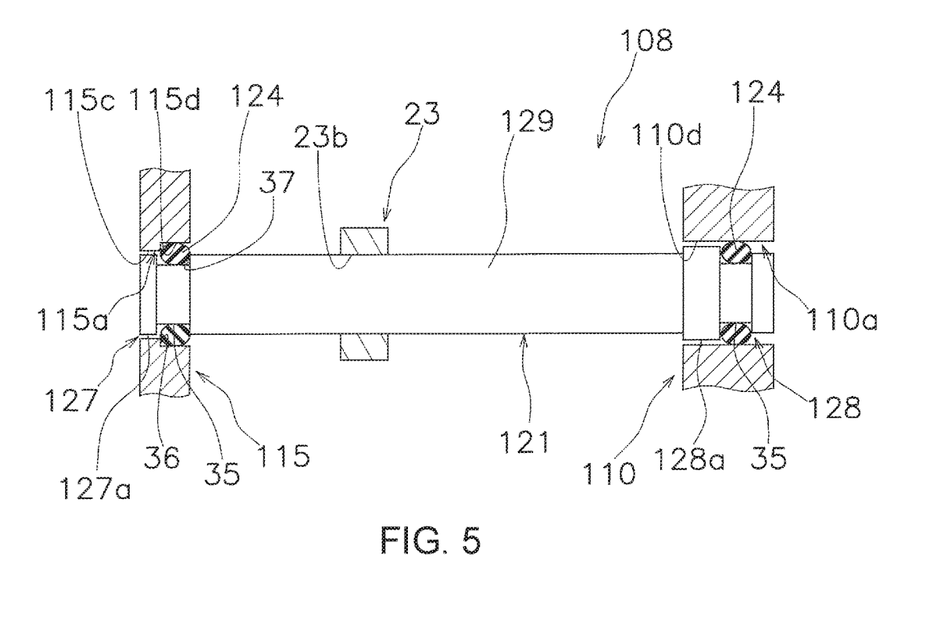
FIG. 5 is a view corresponding to FIG. 4 according to a second embodiment of the present invention.

FIG. 5 is a view schematically showing a first guide shaft 121, elastic members 124, a slider 23, a first mounting hole 115a, and a first through-hole 110a of a spinning reel, to which is applied a reciprocating mechanism 108 according to a second embodiment. Since the other configurations are the same as the first embodiment, the descriptions thereof are omitted. Since the slider 23 is also formed in the same manner as the first embodiment, the description thereof is omitted.

The first guide shaft 121 comprises a first supporting portion 127 and a second supporting portion 128, respectively formed at each end, and an intermediate portion 129 between the first supporting portion 127 and the second supporting portion 128. Since the intermediate portion 129 is formed in the same manner as the first embodiment, the description thereof is omitted.

The first supporting portion 127 comprises an annular groove 35 for holding the elastic member 124, and a first abutting portion 127a. The groove 35 is recessed radially inwardly from the outer perimeter of the first supporting portion 127. The first abutting portion 127a is annularly formed at the end of the first supporting portion 127 adjacent to the groove 35. The outer diameter of the first abutting portion 127a is substantially the same as the outer diameter of the intermediate portion 129.

In the same manner as the first supporting portion 127, an annular groove 35 for holding an elastic member 124 is also formed on the outer perimeter of the second supporting portion 128. The second supporting portion 128 comprises a second abutting portion 128a. The second abutting portion 128a is annularly formed between intermediate portion 129 and the groove 35 of the second supporting portion. The outer diameter of the second abutting portion 128a is larger than the outer diameter of the intermediate portion 129.

The elastic member 124 is a body made of an elastically deformable resin, or the like, for example an O-ring. The elastic members 124 are mounted in the grooves 35, which are respectively formed in the outer perimeters of the first and second supporting portions 127, 128. The elastic members 124 are retained by the grooves 35.

The first mounting hole 115a comprises a first movement regulation part 115c and an annular large-diameter hole portion 115d. The first movement regulation part 115c has a larger diameter than the outer diameter of the first abutting portion 127a, in a position that opposes the first abutting portion 127a of the first supporting portion 127. A prescribed gap is between the first movement regulation part 115c and the first abutting portion 127a. The first movement regulation part 115c abuts the first abutting portion 127a when the elastic member 124 is elastically deformed by a prescribed amount, to regulate the movement of the first supporting portion 127 in the radial direction.

The large-diameter hole portion 115d has a larger diameter than the outer diameter of the first movement regulation part 115c, in a position that opposes the groove 35. The elastic member 124 abuts the large-diameter hole portion 115d. As a result, the first mounting hole 115a supports the first supporting portion 127 via the elastic member 124.

The elastic member 124, which is mounted to the groove 35 of the second supporting portion 128, abuts the first through-hole 110a. As a result, the first through-hole 110a supports the second supporting portion 128 via the elastic member 124.

The first through-hole 110a comprises a second movement regulation part 110d, which can abut the second abutting portion 128a of the second supporting portion 128. The second movement regulation part 110d has a larger diameter than the outer diameter of the second abutting portion 128a, in a position that opposes the second abutting portion 128a. A prescribed gap is disposed between the second movement regulation part 110d and the second abutting portion 128a. The second movement regulation part 110d abuts the second abutting portion 128a when the elastic member 124 is elastically deformed by a prescribed amount, to regulate the movement of the second supporting portion 128 in the radial direction.

By providing first and second movement regulation parts 115c, 110d in this manner, it is possible to regulate the movement of the first guide shaft 121 in the radial direction by the first and second movement regulation parts 115c, 110d, such that the first guide shaft 121 does not significantly move in the radial direction when the elastic member 124 receives a high load and has undergone considerable elastic deformation.

In addition, in the present embodiment, since the outer diameter of the intermediate portion 129 of the first guide shaft 121 has a smaller diameter than the outer diameter of the first mounting hole 115a, as shown in FIG. 5, the front end surface of the intermediate portion 129 of the first guide shaft 121 does not abut the mechanism supporting part 115. The movement of the first guide shaft 121 in the axial direction is regulated by a stepped portion 36 between the first movement regulation part 115c and the large-diameter hole portion 115d, and the elastic member 124 that abuts a stepped portion 37 between the intermediate portion 129 and the groove 35 of the first supporting portion 127. Accordingly, it is also possible to suppress the backlash of the first guide shaft 121 in the axial direction by the elastic member 124 that is mounted to the first guide shaft 121.

Third Embodiment

Figure 6:
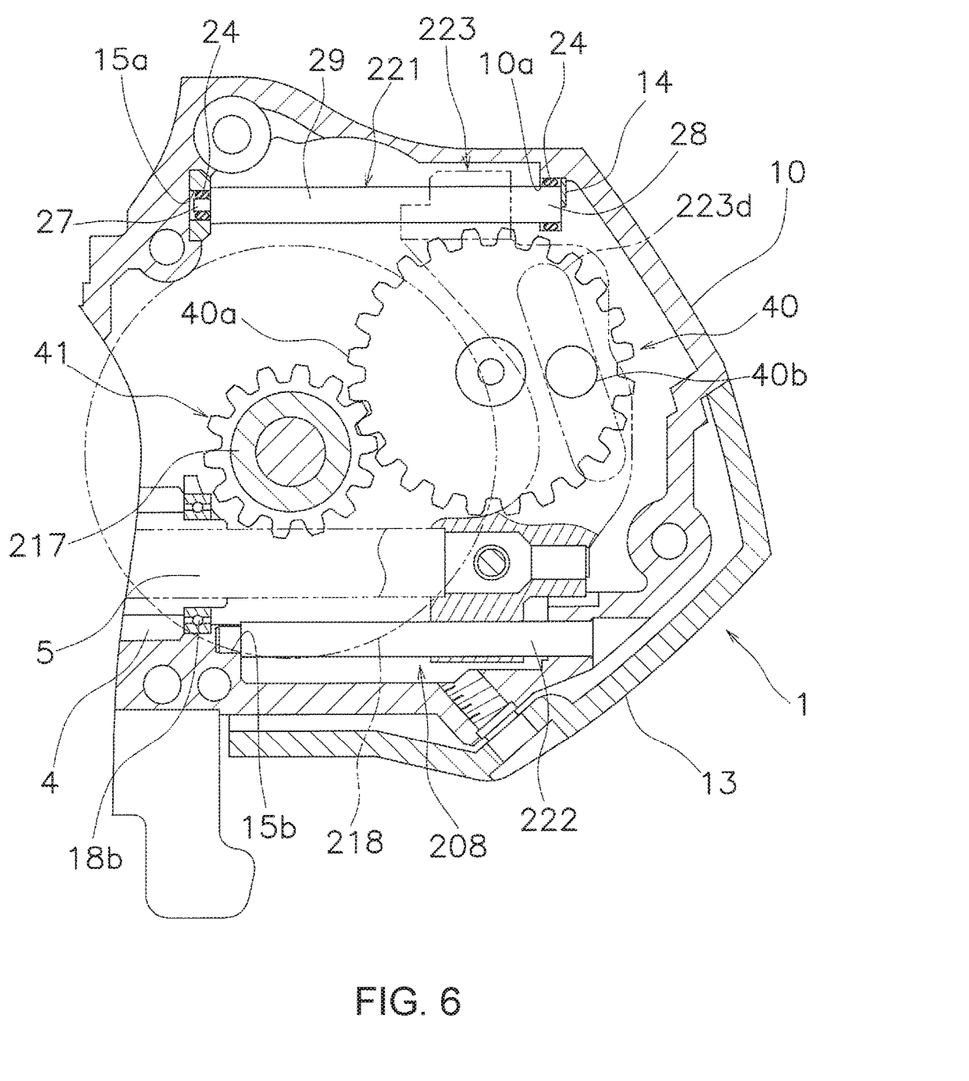
FIG. 6 is a view corresponding to FIG. 3 according to a third embodiment of the present invention.

FIG. 6 is a lateral cross-sectional view of a portion of a spinning reel, to which is employed a reciprocating mechanism 208 according to a third embodiment. In the reciprocating mechanism 208 according to the third embodiment, a slider 223 is reciprocated accompanying the rotation of a cam gear 40 (one example of a rotating member) that meshes with a drive gear 218. Since the other configurations are the same as the first embodiment, the descriptions thereof are omitted. In FIG. 6, the elements that are the same as the first embodiment are given the same reference symbols.

The reciprocating mechanism 208 comprises a driven gear 41 integrally disposed on a drive shaft 217, a cam 40 meshing with the driven gear 41, a slider 223, and first and second guide shafts 221, 222. While a detailed description is omitted since the first and second guide shafts 221, 222 have the same configurations as the first embodiment, elastic members 24 are mounted on the outer perimeter of the first supporting portion 27 and the second supporting portion 28.

The driven gear 41 is integrally disposed on the drive shaft 217 spaced apart from the drive gear 218. The driven gear 41 directly engages a gear portion 40a of the cam gear 40.

The cam gear 40 is disposed rearwardly of the drive shaft 217. The cam gear 40 is rotatably mounted about an axis that is parallel to the drive shaft 217. The cam gear 40 comprises a cylindrical cam portion 40b. The cam portion 40b protrudes in an axial direction parallel to the drive shaft 217.

The slider 223 comprises a cam groove 223d engaging the cam portion 40b. The cam groove 223d is formed in a position that opposes a side surface of the cam gear 40. The cam groove 223d is inclined such that a second end portion proximate to the second guide shaft 222 is closer to the rearward side of the reel body 1 than a first end portion proximate to the first guide shaft 221. When the driven gear 41 is rotated accompanying the rotation of the drive shaft 217, the cam gear 40, meshing with the driven gear 41, is rotated. The cam portion 40b, engaged with the cam groove 223d, is rotated by the rotation of this cam gear 40. The slider 223 is thereby reciprocated along the first and second guide shafts 221, 222.

Other Embodiments

Embodiments of the present invention were described above, but the present invention is not limited to the above-described embodiments, and various modifications can be made without departing from the scope of the invention. In particular, the various embodiments described in the present Specification can be freely combined according to necessity.

In the above-described embodiments, an elastic member 24, 124 is mounted to each of first supporting portions 27, 127 and second supporting portions 28, 128 of a first guide shaft 21, 121, and 221, but the present invention is not limited thereto. The elastic member may be disposed on only one of the first and the second supporting portions. In addition, the groove 35 may be formed in the outer perimeter of only one of the first and second supporting portions to mount the elastic member. At this time, the first or the second abutting portion may be disposed on only one of the first and second supporting portions to which the elastic member is mounted.

In the embodiments described above, two movement regulation parts, the first and second movement regulation parts 115c, 110d, were provided, but there may be only one movement regulation part. That is, the movement regulation part may abut at least one of the first and second supporting portions to which the elastic member is mounted.

In the embodiments described above, two guide shafts, a first guide shaft 21, 121, and 221, and a second guide shaft 22, 122, and 222, were provided; however, only a first guide shaft tray be provided, and the elastic member may be mounted on at least one of the first and the second supporting portions of the first guide shaft. Further, when guiding the slider by one guide shaft, a worm shaft may extend through the slider, and the slider may be guided by the worm shaft and the guide shaft. In addition, a rail that extends in the longitudinal direction may be formed in the reel body, and the slider may be guided by the rail and the guide shaft.

In the embodiments described above, the first and second abutting portions are formed in annular shapes; however, the shape of the abutting portion is not limited thereto. In addition, the shapes of the first and second movement regulation parts may be any shape with which the movement of the first guide shaft in the radial direction is regulated by the first and second abutting portions being abutted thereto.

What is claimed is:

1. A reciprocating mechanism of a spinning reel for reciprocating a spool shaft in an axial direction of the spool shaft with respect to a reel body by a rotation of a handle, a spool being mounted to the spool shaft, the reciprocating mechanism comprising:
   a rotating member having an engagement portion, and being rotated while the handle is rotated;
   a slider connected to the spool shaft, comprising an engaged portion engaged with the engagement portion of the rotating member, and being reciprocated in the axial direction together with the spool shaft, while the rotating member is rotated;
   a first guide shaft having a first supporting portion and a second supporting portion on ends of the first guide shaft, and guiding the reciprocating movement of the slider by supporting the slider on an intermediate portion between the first supporting portion and the second supporting portion; and a first elastic member disposed in a groove on the first supporting portion and a second elastic member disposed around a largest diameter portion of the second supporting portion, and the first elastic member and the second elastic member supporting the first guide shaft on the reel body.

2. The reciprocating mechanism of the spinning reel according to claim 1, wherein the slider abuts the first guide shaft.

3. The reciprocating mechanism of the spinning reel according to claim 1, wherein a diameter of groove of the first supporting portion is less than a diameter of the intermediate portion.

4. The reciprocating mechanism of the spinning reel according to claim 1, further comprising:

a second guide shaft parallel to the spool shaft and guiding reciprocal movement of the slider in the axial direction with a prescribed gap from the slider, the first guide shaft being disposed in a position that is farther from the spool shaft than the second guide shaft.

5. The reciprocating mechanism of the spinning reel according to claim 1, wherein the rotating member is a worm shaft having intersecting spiral grooves on an outer surface thereof, and the engagement portion of the rotating member is the spiral grooves of the worm shaft.

6. The reciprocating mechanism of the spinning reel according to claim 1, wherein the rotating member is a cam gear having a cam portion, and the engagement portion of the rotating member is the cam portion of the cam gear.

7. A spinning reel, comprising:

a reel body;

a handle rotatably disposed on a side portion of the reel body;

a spool shaft disposed in the reel body so as to be movable in a longitudinal direction;

a spool configured to wind line disposed on a front portion of the spool shaft; and a reciprocating mechanism configured to reciprocate the spool shaft in the axial direction of the spool shaft with respect to the reel body in conjunction with the rotation of the handle, the reciprocating mechanism comprising a rotating member having an engagement portion, and being rotated while the handle is rotated, a slider connected to the spool shaft, and comprising an engaged portion engaged with the engagement portion of the rotating member, and being reciprocated in the axial direction together with the spool shaft, while the rotating member is rotated, a first guide shaft with a first supporting portion and a second supporting portion on ends of the first guide shaft, and guiding the reciprocating movement of the slider by supporting the slider by an intermediate portion between the first supporting portion and the second supporting portion, a first elastic member disposed in a groove on the first supporting portion and a second elastic member disposed around a largest diameter portion of the second supporting portion, and the first guide shaft being supported on the reel body via the first elastic member and the second elastic.

8. The spinning reel according to claim 7, wherein the reel body further comprises a movement regulation part abutting at least one of the first supporting portion and the second supporting portion to which the elastic member is mounted such that the first and second elastic members undergo a prescribed amount of elastic deformation to regulate the movement of the first guide shaft in a radial direction.

* * * * *